US012094305B2

(12) United States Patent
Hawkins et al.

(10) Patent No.: US 12,094,305 B2
(45) **Date of Patent: *Sep. 17, 2024**

(54) GAMING METHOD AND APPARATUS USING CLUSTER BASED AWARDS

(71) Applicant: Aristocrat Technologies Australia Pty Limited, North Ryde (AU)

(72) Inventors: Ryan Paul Hawkins, Henderson, NV (US); Yanis Tsombanidis, Las Vegas, NV (US); Stephanie Johns, Las Vegas, NV (US); Robert Honeycutt, Henderson, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/953,781

(22) Filed: Sep. 27, 2022

(65) Prior Publication Data

US 2023/0021862 A1 Jan. 26, 2023

Related U.S. Application Data

(63) Continuation of application No. 17/201,137, filed on Mar. 15, 2021, now Pat. No. 11,468,746, which is a continuation of application No. 14/869,660, filed on Sep. 29, 2015, now Pat. No. 10,964,173.

(30) Foreign Application Priority Data

Sep. 29, 2014 (AU) ................................ 2014903909

(51) Int. Cl.
*G07F 17/34* (2006.01)
*G07F 17/32* (2006.01)

(52) U.S. Cl.
CPC .............. *G07F 17/34* (2013.01); *G07F 17/32* (2013.01); *G07F 17/3211* (2013.01); *G07F 17/3213* (2013.01); *G07F 17/3244* (2013.01)

(58) Field of Classification Search
CPC ............. G07F 17/3213; G07F 17/3211; G07F 17/3244; G07F 17/34
See application file for complete search history.

(56) References Cited

U.S. PATENT DOCUMENTS 4,448,419 A * 5/1984 Telnaes ............... G07F 17/3244 463/21
5,275,400 A * 1/1994 Weingardt ............. G07F 17/32 463/28

(Continued)

OTHER PUBLICATIONS

Office Action (Non-Final Rejection) dated Feb. 3, 2022 for U.S. Appl. No. 17/201,137 (pp. 1-13).

(Continued)

*Primary Examiner* — William H McCulloch, Jr.
(74) *Attorney, Agent, or Firm* — McAndrews, Held & Malloy, Ltd.

(57) ABSTRACT

The present invention relates to gaming machines, systems and methods of gaming. There are a number of different ways available for determining an award by current gaming machines and systems. In this embodiment, a game controller is arranged to determine an award depending on the number of columns spanned by a cluster of symbols and the number of symbol positions in the cluster.

20 Claims, 8 Drawing Sheets

(56) References Cited

U.S. PATENT DOCUMENTS

| | | | | | |
|---|---|---|---|---|---|
| 6,142,872 | A * | 11/2000 | Walker | G07F 17/3239 | 463/16 |
| 6,146,271 | A * | 11/2000 | Kadlic | A63F 3/00157 | 463/13 |
| 6,244,958 | B1 * | 6/2001 | Acres | G07F 17/3281 | 463/16 |
| 6,413,162 | B1 * | 7/2002 | Baerlocher | G07F 17/3202 | 463/20 |
| 7,070,502 | B1 * | 7/2006 | Bussick | G07F 17/34 | 463/20 |
| 7,819,742 | B2 * | 10/2010 | Chamberlain | G07G 5/00 | 463/16 |
| 10,720,007 | B2 * | 7/2020 | Hawkins | G07F 17/3258 | |
| 10,839,638 | B2 * | 11/2020 | Hawkins | G07F 17/3246 | |
| 10,964,173 | B2 * | 3/2021 | Hawkins | G07F 17/32 | |
| 11,468,746 | B2 * | 10/2022 | Hawkins | G07F 17/32 | |
| 2001/0031659 | A1 * | 10/2001 | Perrie | A63F 3/0645 | 463/18 |
| 2002/0043759 | A1 * | 4/2002 | Vancura | A63F 9/183 | 273/139 |
| 2002/0045474 | A1 * | 4/2002 | Singer | G07F 17/3216 | 463/20 |
| 2002/0155882 | A1 * | 10/2002 | Baerlocher | G07F 17/34 | 463/20 |
| 2003/0045345 | A1 * | 3/2003 | Berman | G07F 17/34 | 463/20 |
| 2003/0060259 | A1 * | 3/2003 | Mierau | G07F 17/3244 | 463/16 |
| 2003/0216165 | A1 * | 11/2003 | Singer | G07F 17/3211 | 463/20 |
| 2006/0073879 | A1 * | 4/2006 | Baerlocher | G07F 17/3267 | 463/20 |
| 2006/0128456 | A1 * | 6/2006 | Berman | G07F 17/3244 | 463/13 |
| 2007/0060255 | A1 * | 3/2007 | Baerlocher | G07F 17/34 | 463/16 |
| 2010/0222127 | A1 * | 9/2010 | Finch | G07F 17/3262 | 463/43 |
| 2010/0304833 | A1 * | 12/2010 | Berman | G07F 17/34 | 463/20 |
| 2011/0098100 | A1 * | 4/2011 | Tsombanidis | G07F 17/3211 | 463/20 |
| 2013/0065664 | A1 * | 3/2013 | Clemens | G07F 17/3267 | 463/20 |
| 2013/0296018 | A1 * | 11/2013 | Aida | G07F 17/34 | 463/20 |
| 2014/0162751 | A1 * | 6/2014 | Ryan | G07F 17/3267 | 463/20 |
| 2014/0274289 | A1 * | 9/2014 | Dunn | G07F 17/326 | 463/20 |
| 2014/0274294 | A1 * | 9/2014 | Baerlocher | G07F 17/326 | 463/20 |
| 2015/0087382 | A1 * | 3/2015 | Gilbertson | G07F 17/326 | 463/20 |
| 2015/0221176 | A1 * | 8/2015 | Meyer | G07F 17/34 | 463/20 |
| 2016/0093151 | A1 * | 3/2016 | Hawkins | G07F 17/3246 | 463/21 |
| 2016/0093153 | A1 * | 3/2016 | Hawkins | G07F 17/3211 | 463/20 |
| 2017/0024973 | A1 * | 1/2017 | Montenegro | G07F 17/3213 | |
| 2017/0316646 | A1 * | 11/2017 | Hawkins | G07F 17/3244 | |
| 2021/0201629 | A1 * | 7/2021 | Hawkins | G07F 17/3244 | |
| 2021/0398393 | A1 * | 12/2021 | Honeycutt | G07F 17/3213 | |
| 2022/0028216 | A1 * | 1/2022 | Hawkins | G07F 17/32 | |
| 2022/0044527 | A1 * | 2/2022 | Hawkins | G07F 17/3251 | |
| 2022/0092920 | A1 * | 3/2022 | Hawkins | G07F 17/3258 | |
| 2023/0021862 | A1 * | 1/2023 | Hawkins | G07F 17/3244 | |

OTHER PUBLICATIONS

Examination Report for AU2017203303, dated Dec. 13, 2017, 3 pages.

Examination Report for AU2018278994, dated Feb. 11, 2020, 3 pages.

Office Action dated Jul. 24, 2020 for U.S. Appl. No. 14/869,660 (pp. 1-16).

Notice of Allowance dated Jan. 29, 2021 for U.S. Appl. No. 14/869,660 (pp. 1-7).

Office Action (Notice of Allowance and Fees Due (PTOL-85)) dated Jun. 23, 2022 for U.S. Appl. No. 17/201,137 (pp. 1-13).

* cited by examiner

Pays 700 - 4 of a Kind X 7 for each cluster.

Pays 7000 - 6 of a Kind X 14.

Pays 800 - 4 of a Kind X 16.

GAMING METHOD AND APPARATUS USING CLUSTER BASED AWARDS

RELATED APPLICATIONS

This application is a continuation of U.S. patent application Ser. No. 17/201,137, filed Mar. 15, 2021, which is a continuation of U.S. patent application Ser. No. 14/869,660, filed Sep. 29, 2015, which claims priority to Australian Provisional Patent Application No. 2014903909, filed Sep. 29, 2014, the disclosures of which are incorporated herein by reference in their entirety.

BACKGROUND OF THE INVENTION

Gaming equipment is known which utilize sets of symbols for play of a game. Symbols can comprise any symbols, such as letters, numbers, representations of figures, fruit, characters or any other symbols. "Slot" gaming machines are arranged to select combinations of symbols from the set of symbols for each play of the game and determine an award based on the selected combination of symbols.

In "reel" slot games, the gaming equipment comprises a display which is arranged to display the symbols on a plurality of spinning reels. When the reels have come to a stop, they display the symbols selected from the set of symbols, for the particular game. The gaming system is arranged to determine an outcome based upon the selected set of displayed symbols. The outcome may be determined based on particular combinations of symbols, such as one or more lines of symbols appearing in the display, scatter symbols, and other combinations.

Modern electronic gaming equipment includes video displays which present video simulating the plurality of spinning reels bearing the symbols.

Mechanical gaming systems are also known, the display comprising actual mechanical reels bearing the symbols. The reels may be activated by stepper motors.

While such gaming equipment provides players with enjoyment, a need exists for alternative gaming systems in order to maintain or increase player enjoyment.

BRIEF SUMMARY OF THE INVENTION

In a first aspect, the present invention provides a gaming machine, comprising:

a display, and a game controller arranged to select a plurality of symbols from a symbol set for display at a plurality of symbol positions on the display, the symbol positions comprising a plurality of columns of symbol positions and a plurality of rows of symbol positions, the game controller further being arranged to determine an award based on a cluster of symbols appearing in the selected symbol set, a cluster comprising a group of symbols, each symbol in the group being contiguous to another symbol in the group along at least one edge, and the group spanning at least two columns, the game controller being arranged to determine the award depending on the number of columns spanned by the cluster and the number of symbol positions in the cluster.

In an embodiment, the display is arranged to display the symbols as a plurality of spinning reels bearing the symbols, that come to rest to display the selected plurality of symbols from the symbol set. Embodiments of the invention have the advantage that clusters are applied in a game which has the look and feel of a traditional spinning reel slot game. Having a payout based on a combination of a number of columns spanned by the cluster and the number of cells in the cluster, is advantageously intuitive to a person used to playing traditional slot games. Clusters are not known with traditional slot, spinning reel type games.

In an embodiment, the cluster does not span all the columns in the display. The symbols in the cluster may not appear in one or either of the columns at each end of the display, for example.

In an embodiment, the cluster does not span all the 10 rows of the display. It may not reach the top or bottom rows, for example.

In an embodiment, the cluster may be formed by symbol positions anywhere in the "grid" of symbol positions determined by the number of columns and number of rows in the display. In spinning reel games where reels stop at different times from each other, this has the advantage that a player will perceive that an award may still be possible until the last reel stops. This advantageously increases the anticipation and excitement of a game.

Some slot games are known where the reel area expands as the game is played. These games include Reel Power™, by Aristocrat. It is difficult to control the payout cost of such games, as it rises exponentially, making it very difficult to afford extreme reel growth. In an embodiment, the game controller is arranged to generate a reel game where reel growth occurs. The use of a cluster for providing an award, with a requirement that each symbol position in the cluster touch another symbol position on at least one edge, facilitates control of the exponential cost of a reel growth-type game.

In accordance with a second aspect, the present invention provides a gaming machine, comprising:

a game controller arranged to select a plurality of symbols from a symbol set for display at a plurality of symbol positions on a display. The symbol positions comprising a plurality of columns of symbol positions and a plurality of rows of symbol positions, the game controller further being arranged to determine an award based on a cluster of symbols appearing in the selected symbol set, a cluster comprising a group of symbols, each symbol in the group being contiguous to another symbol in the group, along at least one edge, and the group spanning at least two columns, the game controller being arranged to determine the award depending on the number of columns spanned by the cluster and the number of symbol positions in the cluster.

In accordance with a third aspect, the present invention provides a gaming machine, comprising:

a display, a symbol selector arranged to select a plurality of symbols from a symbol set, a display controller arranged to display the selected plurality of symbols at a plurality of symbol positions on the display, the symbol positions comprising a plurality of columns of symbol positions and a plurality of rows of symbol positions, and an outcome generator being arranged to determine an award based on a cluster of symbols appearing in the selected symbol set, a cluster comprising a group of symbols, each symbol in the group being contiguous to another symbol in the group along at least one edge, and the group spanning at least two columns, the outcome generator being arranged to determine the award depending on the number of columns spanned by the cluster and the number of symbol positions in the cluster.

In accordance with a fourth aspect, the present invention provides a gaming system, comprising:

a display, and a game controller arranged to select a plurality of symbols from a symbol set for display at a plurality of symbol positions on the display, the symbol positions comprising a plurality of columns of symbol positions and a plurality of rows of symbol positions, the game controller further being arranged to determine an award based on a cluster of symbols appearing in the selected symbol set, a cluster comprising a group of symbols, each symbol in the group being contiguous to another symbol in the group along at least one edge, and the group spanning at least two columns, the game controller being arranged to determine the award depending on the number of columns spanned by the cluster and the number of symbol positions in the cluster.

In accordance with a fifth aspect, the present invention provides a method of gaming, comprising the steps of:

selecting a plurality of symbols from a symbol set for display at a plurality of symbol positions on a display, the symbol positions comprising a plurality of columns of symbol positions and a plurality of rows of symbol positions, determining an award based on a cluster of symbols appearing in the selected symbol set, a cluster comprising a group of symbols, each symbol in the group being contiguous to another symbol in the group along at least one edge, and the group spanning at least two columns, determining the award depending on the number of columns spanned by the cluster and the number of symbol positions in the cluster.

In accordance with a sixth aspect, the present invention provides a gaming system comprising a game server and a computing device that is remote to the game server, the game server and the computing device being arranged to interact with each other via a data network, the game server being arranged to determine an outcome for a game of chance and visually depict the outcome on a display of the computing device, the game server is arranged to depict the outcome of the display by displaying a plurality of selected symbols at a plurality of symbol positions on the display, the symbol positions comprising a plurality of columns of symbol positions and a plurality of rows of symbol positions, the game server being arranged to determine an award based on a cluster of symbols appearing in the displayed symbols, the cluster comprising a group of symbols, each symbol in the group being contiguous to another symbol in the group along at least one edge, and the group spanning at least two columns, the game server being arranged to determine the award depending on the number of columns spanned by the cluster and the number of symbol positions in the cluster.

In accordance with a seventh aspect, the present invention provides a computer program, comprising instructions for controlling a computer to implement a gaming equipment in accordance with any of the first to sixth aspects of the invention discussed above.

In accordance with an eighth aspect, the present invention provides a tangible computer readable medium providing a computer program in accordance with a fifth aspect of the invention.

In accordance with a ninth aspect, the present invention provides a data signal, providing a computer program in accordance with the fifth aspect of the invention.

In accordance with a tenth aspect, the present invention provides a computer programmed with a program in accordance with the seventh aspect of the invention.

In accordance with an eleventh aspect, the present invention provides a gaming machine, comprising:

a display, and a game controller arranged to select a plurality of symbols from a symbol set for display at a plurality of symbol positions on the display, the symbol positions comprising a plurality of columns of symbol positions and a plurality of rows of symbol positions, the game controller being arranged to control the display to affect the columns as a plurality of spinning reels that have come to a standstill to display the selected symbol set, the game controller further being arranged to determine an award based on a cluster of symbols appearing in the selected symbol set, a cluster comprising a group of symbols, each symbol in the group being contiguous to another symbol in the group along at least one edge, and the group spanning at least two columns, the cluster not spanning all the columns in the display.

In an embodiment, the cluster does not span all the rows in the display.

It is an advantage of at least an embodiment, that the gaming system provides a game which has the "look and feel" of a traditional slot game with spinning reels, yet provides awards based on clusters. Another advantage of at least an embodiment is that player anticipation and excitement is maintained as players realize that a cluster award is always possible until the last reel stops, in games where the reels appear to stop at different times.

In an embodiment, the game controller is arranged to determine an award based upon the number of columns spanned by the cluster and the number of symbol positions in the cluster. In an embodiment, an award is based on a number of columns spanned by the cluster multiplied by the number of symbols in the cluster.

In accordance with a twelfth aspect, the present invention provides a gaming machine, comprising:

a game controller arranged to select a plurality of symbols from a symbol set for display at a plurality of symbol positions on the display, the symbol positions comprising a plurality of columns of symbol positions and a plurality of rows of symbol positions, the game controller being arranged to control the display to effect the columns as a plurality of spinning reels that have come to a standstill to display the selected symbol set, the game controller further being arranged to determine an award based on a cluster of symbols appearing in the selected symbol set, a cluster comprising a group of symbols, each symbol in the group being contiguous to another symbol in the group along at least one edge, and the group spanning at least two columns, the cluster not spanning all the columns in the display.

In accordance with a thirteenth aspect, the present invention provides a gaming machine, comprising:

a display, a symbol selector arranged to select a plurality of symbols from a symbol set, a display controller arranged to display the plurality of symbols at a plurality of symbol positions on the display, the symbol positions comprising a plurality of columns of symbol positions and a plurality of rows of symbol positions, the display controller being arranged to control the display to effect the columns as a plurality of spinning reels that come to a standstill to display the selected symbol set, an outcome generator arranged to determine an award based on a cluster of symbols appearing in the selected symbol set, a cluster comprising a group of symbols, each symbol in the group being contiguous to another symbol in the group along at least one edge, and the group spanning at least two columns, the cluster not spanning all the columns in the display.

In accordance with a fourteenth aspect, the present invention provides a method of gaming, comprising the steps of:

selecting a plurality of symbols from a symbol set that display a plurality of symbol positions on the display, the symbol positions comprising a plurality of columns of symbol positions and a plurality of rows of symbol positions, controlling the display to effect the columns as a plurality of spinning reels that come to a standstill to display the selected symbol set, determining an award based on the cluster of symbols appearing in the selected symbol set, a cluster comprising a group of symbols, each symbol in the group being contiguous to another symbol in the group along at least one edge, and the group spanning at least two columns, the cluster not spanning all the columns in the display.

In accordance with a fifteenth aspect, the present invention provides a gaming system comprising a game server and a computing device that is remote to the game server, the game server and the computing device being arranged to interact with each other via a data network, the game server being arranged to determine an outcome for a game of chance and visually depict the outcome on a display of the computing device, the game server being arranged to depict the outcome on the display by simulating a plurality of spinning reels that come to a standstill to display a selected symbol set, the game server being arranged to determine an award based on a cluster of symbols appearing in the selected symbol set, a cluster comprising a group of symbols, each symbol in the group being contiguous to another symbol in the group along at least one edge, and the group spanning at least two columns, the cluster not spanning all the columns in the display.

In accordance with a sixteenth aspect, the present invention provides a computer program, comprising instructions for controlling a computer to implement gaming equipment in accordance with any of the eleventh to thirteenth and fifteenth aspects of the invention.

In accordance with an seventeenth aspect, the present invention provides a tangible computer readable medium providing a computer program in accordance with the sixteenth aspect of the invention.

In accordance with an eighteenth aspect, the present invention provides a data signal, providing a computer program in accordance with a sixteenth aspect of the invention.

In accordance with a nineteenth aspect, the present invention provides a computer, programmed with a computer program in accordance with a sixteenth aspect of the invention.

In accordance with yet another aspect, the present invention provides a gaming system comprising a game server and a computing device that is remote to the game server, the game server and the computing device being arranged to interact with each other via a data network, the game server being arranged to determine an outcome for a game of chance and visually depict the outcome on a display of the computing device, the game server is arranged to depict the outcome of the display by displaying a plurality of selected symbols at a plurality of symbol positions on the display, the symbol positions comprising a plurality of columns of symbol positions and a plurality of rows of symbol positions, the game server being arranged to determine an award based on a cluster of symbols appearing in the displayed symbols, the cluster comprising a group of symbols, each symbol in the group being contiguous to another symbol in the group along at least one edge, and the group spanning at least two columns, the game server being arranged to determine the award depending on the number of columns spanned by the cluster and the number of symbol positions in the cluster.

In some embodiments, the gaming system may comprise a computer program, comprising instructions for controlling a computer to implement a gaming equipment.

In some embodiments, the computer program may be stored in a tangible computer readable medium.

In some embodiments, the computer program may generate a data signal.

In accordance with yet another aspect, the present invention provides a gaming machine comprising a display, and a game controller arranged to select a plurality of symbols from a symbol set for display at a plurality of symbol positions on the display, the symbol positions comprising a plurality of columns of symbol positions and a plurality of rows of symbol positions, the game controller being arranged to control the display to affect the columns as a plurality of spinning reels that have come to a standstill to display the selected symbol set, the game controller further being arranged to determine an award based on a cluster of symbols appearing in the selected symbol set, a cluster comprising a group of symbols, each symbol in the group being contiguous to another symbol in the group along at least one edge, and the group spanning at least two columns, the cluster not spanning all the columns in the display.

In some embodiments, the cluster does not span all the rows in the display.

In accordance with yet another aspect, the present invention provides a gaming machine comprising a game controller arranged to select a plurality of symbols from a symbol set for display at a plurality of symbol positions on the display, the symbol positions comprising a plurality of columns of symbol positions and a plurality of rows of symbol positions, the game controller being arranged to control the display to effect the columns as a plurality of spinning reels that have come to a standstill to display the selected symbol set, the game controller further being arranged to determine an award based on a cluster of symbols appearing in the selected symbol set, a cluster comprising a group of symbols, each symbol in the group being contiguous to another symbol in the group along at least one edge, and the group spanning at least two columns, the cluster not spanning all the columns in the display.

In accordance with yet another aspect, the present invention provides a gaming machine, comprising a display, a symbol selector arranged to select a plurality of symbols from a symbol set, a display controller arranged to display the plurality of symbols at a plurality of symbol positions on the display, the symbol positions comprising a plurality of columns of symbol positions and a plurality of rows of symbol positions, the display controller being arranged to control the display to effect the columns as a plurality of spinning reels that come to a standstill to display the selected symbol set, and an outcome generator arranged to determine an award based on a cluster of symbols appearing in the selected symbol set, a cluster comprising a group of symbols, each symbol in the group being contiguous to another symbol in the group along at least one edge, and the group spanning at least two columns, the cluster not spanning all the columns in the display.

In accordance with yet another aspect, the present invention provides a method of gaming, comprising selecting a plurality of symbols from a symbol set that display a plurality of symbol positions on the display, the symbol positions comprising a plurality of columns of symbol positions and a plurality of rows of symbol positions, controlling the display to effect the columns as a plurality of spinning reels that come to a standstill to display the selected symbol set, and determining an award based on the cluster of symbols appearing in the selected symbol set, a cluster comprising a group of symbols, each symbol in the group being contiguous to another symbol in the group along at least one edge, and the group spanning at least two columns, the cluster not spanning all the columns in the display.

In accordance with yet another aspect, the present invention provides a gaming system comprising a game server and a computing device that is remote to the game server, the game server and the computing device being arranged to interact with each other via a data network, the game server being arranged to determine an outcome for a game of chance and visually depict the outcome on a display of the computing device, the game server being arranged to depict the outcome on the display by simulating a plurality of spinning reels that come to a standstill to display a selected symbol set, the game server being arranged to determine an award based on a cluster of symbols appearing in the selected symbol set, a cluster comprising a group of symbols, each symbol in the group being contiguous to another symbol in the group along at least one edge, and the group spanning at least two columns, the cluster not spanning all the columns in the display.

In some embodiments, the gaming system may comprise a non-transitory computer readable medium providing a computer program, comprising instructions for controlling a computer to implement the gaming system.

BRIEF DESCRIPTION OF SEVERAL VIEWS OF THE DRAWINGS

Features and advantages of the present invention will become apparent from the following description of embodiments thereof, with reference to the accompanying drawings, in which.

DETAILED DESCRIPTION OF THE INVENTION

Figure 1:
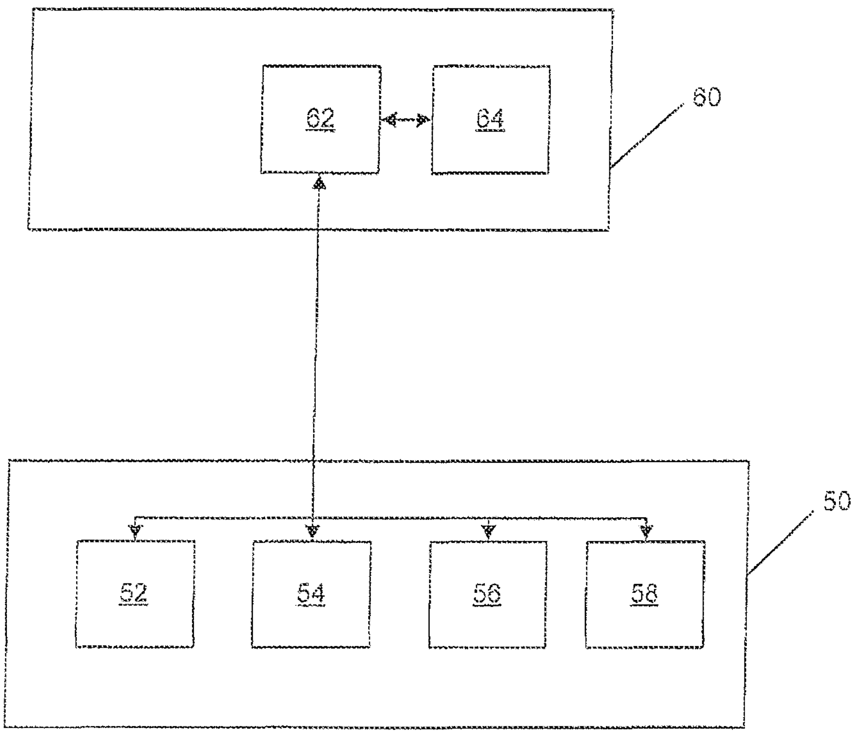
FIG. 1 is a block diagram of the core components of a gaming system.

Referring to the Drawings, there is shown gaming equipment arranged to implement a game in accordance with embodiments of the present invention. The gaming equipment of this embodiment comprises a display on which symbols appear in rows and columns of symbol positions. In an embodiment, the rows and columns of symbol positions may be affected as a virtual video reel, comprising a plurality of reels forming the columns. Alternatively, the display may be implemented as a mechanical set of reels.

Figure 8:
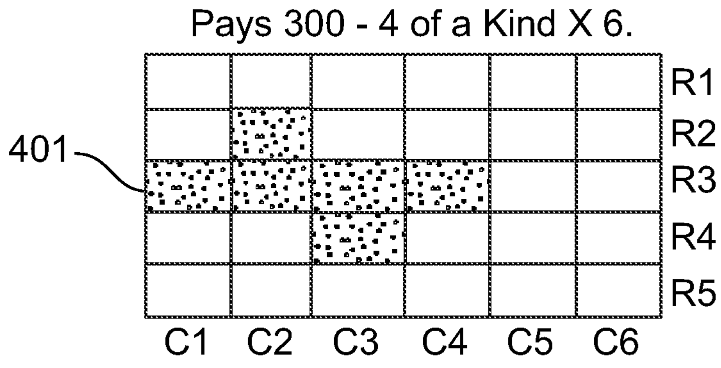

Referring to FIG. 8, a schematic representation of a display generated by an embodiment of the gaming equipment is illustrated. This particular display has six columns (C1 through C6) and five rows (R1 through R5). The gaming equipment is arranged to control a selection of the symbols and the display, based on random selection of symbols, to provide a selected combination of symbols from a symbol set, appearing on the display.

Figure 7:
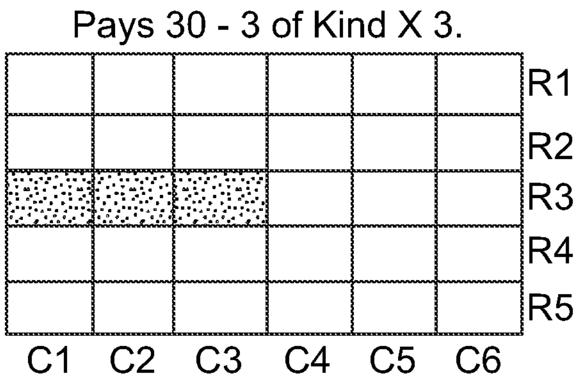
FIGS. 7 to 12 are schematic representations of example displays generated by a gaming system in accordance with an embodiment of the present invention.

In the example of FIG. 8, the selected symbol set includes a cluster of symbols, referenced by numeral 401 in the Figure. A cluster comprises a group of symbols, each symbol in the group being contiguous to another symbol in the group in the symbol positions, along at least one edge, and the group spanning at least two columns. In the example of FIG. 7, it can be seen that the cluster spans four columns and has six members in the group.

The gaming equipment is arranged to determine an award, in this embodiment based on the number of columns spanned by the cluster multiplied by the number of symbols in the cluster.

General Construction of Gaming Equipment

The gaming equipment of embodiments of the present invention can take a number of different forms. In a first form, a standalone gaming machine is provided wherein all or most components required for implementing the game are present in a player operable gaming machine.

In a second form, a distributed architecture (such as an online gaming system) is provided wherein some of the components required for implementing the game are present in a player operable gaming machine, or a general purpose computing device such as a laptop or smart phone or other mobile device or PC, and some of the components required for implementing the game are located remotely relative to the gaming machine in a game server. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

In embodiments, gaming may be implemented over a network, such as the Internet. The gaming system may comprise software and hardware maintained remotely and accessible over the Web via player devices, such as computers, mobile devices and any other device that can access the Internet. Execution of the game may occur in the "cloud", for example, and the interface be implemented by the client device.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in standalone gaming machine mode, "thick client" mode or "thin client" mode depending on the game being played, operating conditions, and so on. Other variations will be apparent to persons skilled in the art.

Irrespective of the form, gaming equipment has several core components. At the broadest level, the core components are a player interface 50 and a game controller 60 as illustrated in FIG. 1. The player interface is arranged to enable manual interaction between a player and the gaming equipment and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also known to provide a specific purpose processor using an application specific integrated circuit (ASIC) or a field programmable gate array (FPGA).

Figure 2:
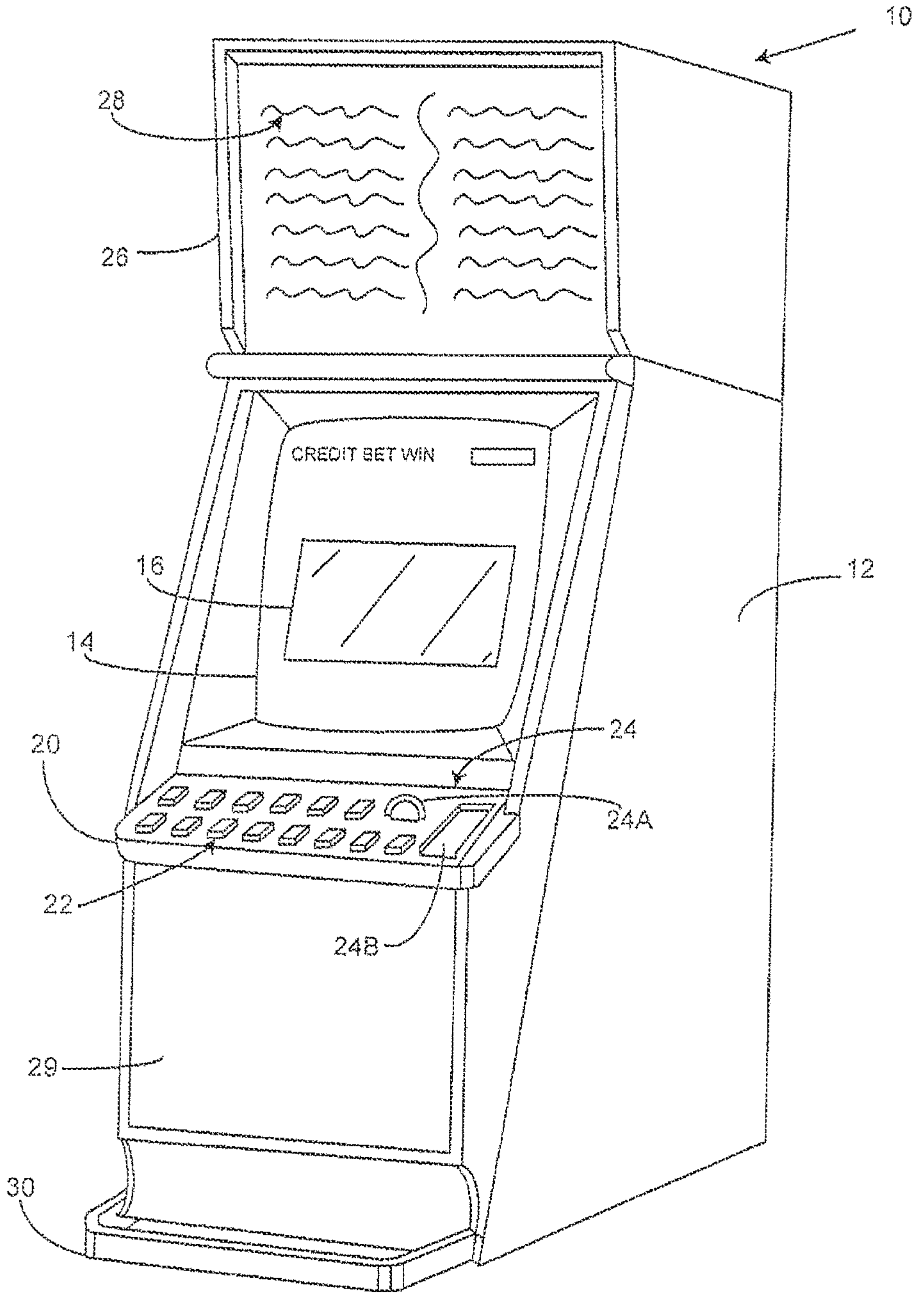
FIG. 2 is a perspective view of a standalone gaming machine.

Gaming equipment in the form of a standalone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
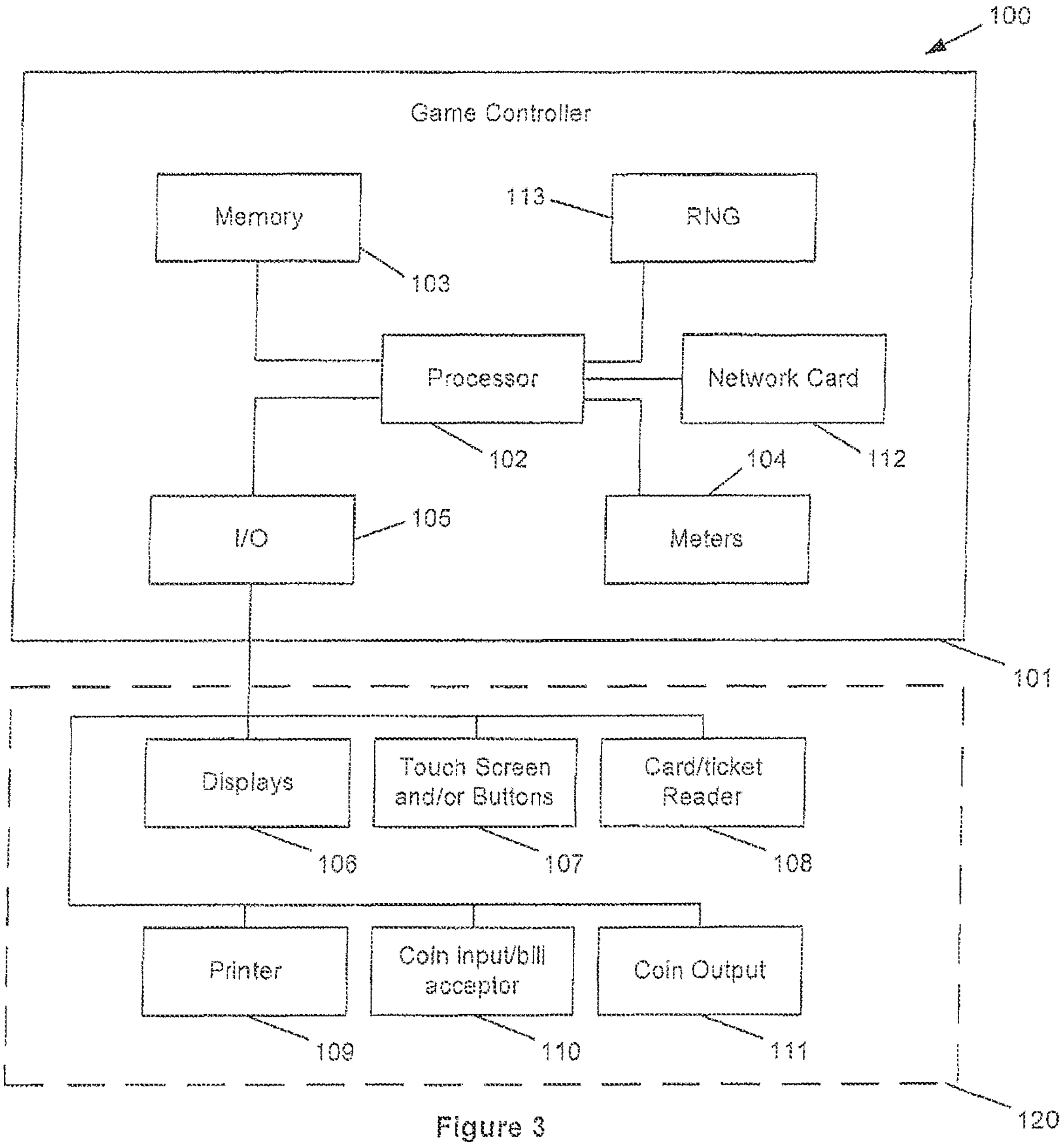
FIG. 3 is a block diagram of the functional components of the gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and nonvolatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
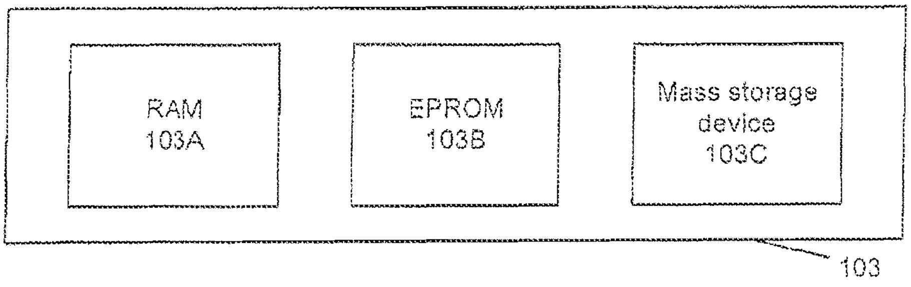
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
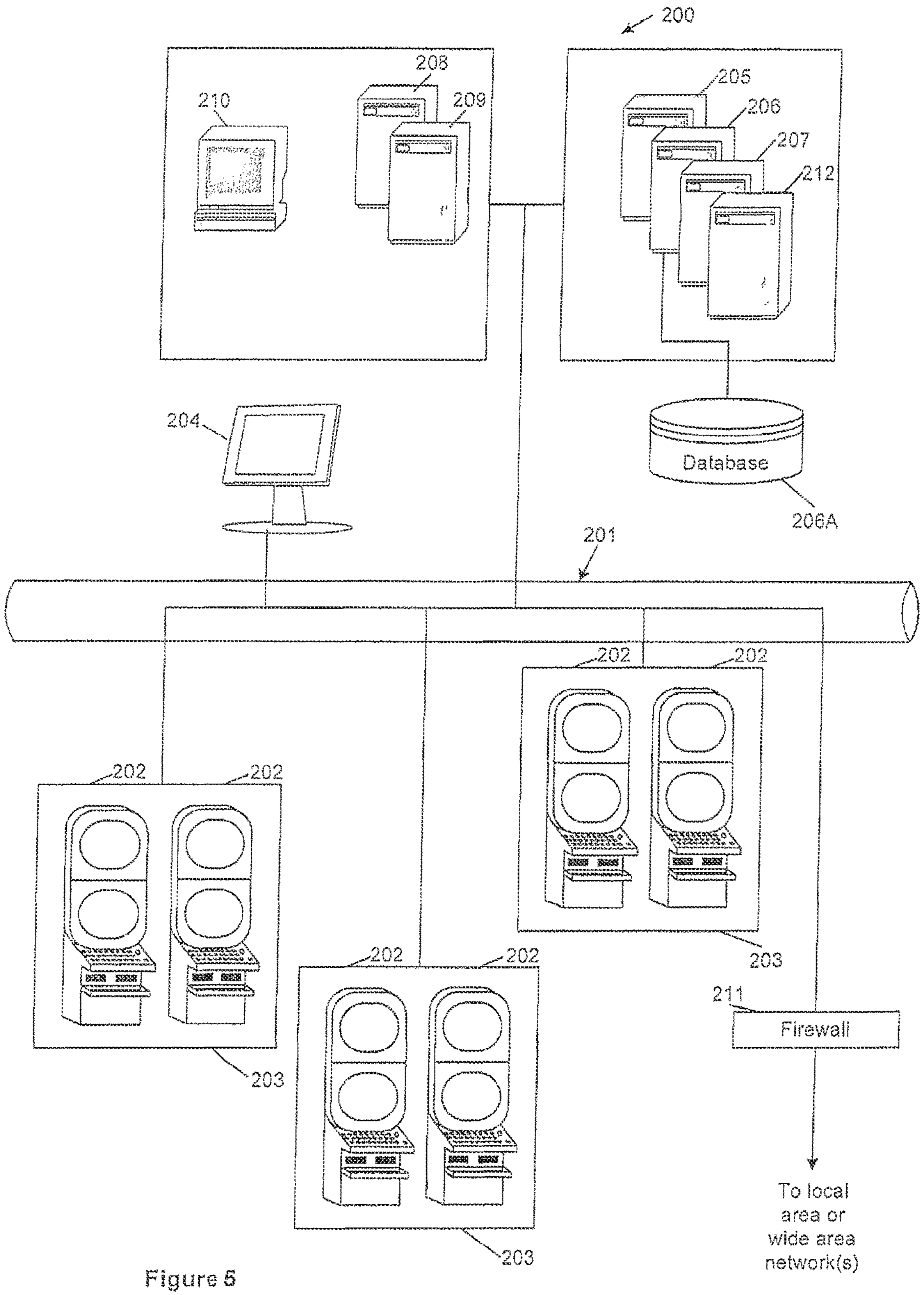
FIG. 5 is a schematic diagram of a network gaming system.

FIG. 5 shows a gaming system 200 in accordance with an alternative embodiment. The gaming system 200 includes a network 201, which for example may be an Ethernet network. The gaming system 200 can, for example, be used to provide online gaming over the Internet. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

The player operates the game play mechanism 56 to specify a wager and hence the win entitlement which will be evaluated for this play of the game and initiates a play of the game. Persons skilled in the art will appreciate that a player's win entitlement will vary from game to game dependent on player selections. In most spinning reel games, it is typical for the player's entitlement to be affected by the amount they wager and selections they make (i.e. the nature of the wager). For example, a player's win entitlement may be based on how many lines they play in each game—e.g. a minimum of one line up to the maximum number of lines allowed by the game (noting that not all permutations of win lines may be available for selection) and how much they wager per line. Such win lines are typically formed by a combination of symbol display positions, one from each reel, the symbol display positions being located relative to one another such that they form a line.

In many games, the player's win entitlement is not strictly limited to the lines they have selected, for example, "scatter" pays are awarded independently of a players selection of pay lines and are an inherent part of the win entitlement.

Persons skilled in the art, will appreciate that in other embodiments, the player may obtain a win entitlement by selecting a number of reels to play and an amount to wager per reel. Such games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reels, the active display positions being all display positions of each selected reel and the designated display position of the non-selected reels. As a result for five reels and fifteen display positions there are 243 ways to win.

In other embodiments a player win entitlement may be affected by purchasing access to particular pay tables—e.g. a first bet amount entitles the player to wins including cherries and a second amount entitles them to wins including plums.

Figure 6:
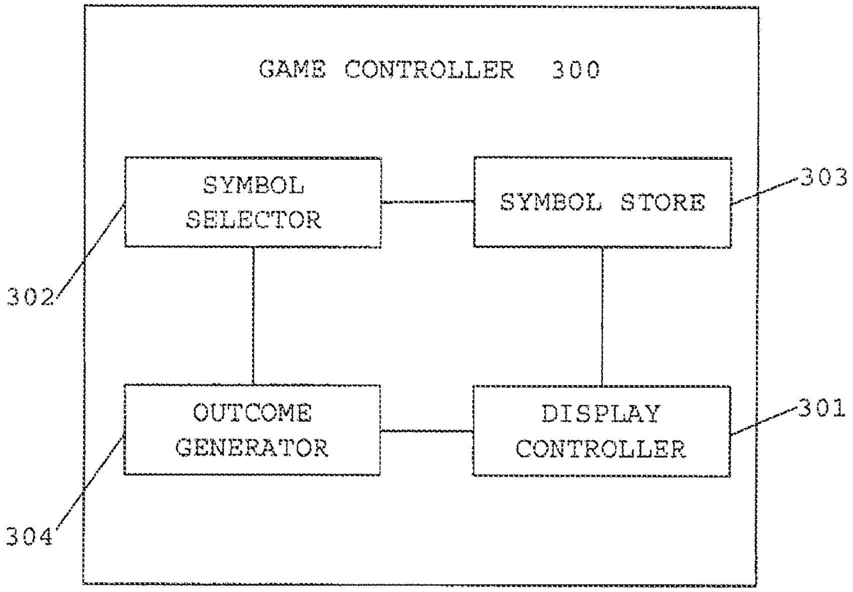
FIG. 6 is a schematic diagram of functional components of a gaming system in accordance with an embodiment of a present invention.

Referring to FIG. 6, functionality of embodiments of the present invention may be implemented by a game controller 300 having the functional components illustrated. In these embodiments, the functional components are implemented utilizing a processor and memory (such as processor 102 and memory 103 in FIG. 3, or processor 62 and memory 64 in FIG. 1, or the game server 205 of FIG. 5) and associated programming. Other implementations are envisaged. For example, the functional blocks of FIG. 6 may be implemented in hardware (e.g. PGAs, FPGAs) or as separate units, or a combination of hardware and software as separate units. Any practical implementation of these functional units may be employed.

Referring to FIG. 6, the game controller 300 includes a symbol selector 301 which is arranged to select a plurality of symbols from a set of symbols. In this embodiment, an outcome generator determines a game outcome based on the symbols selected by the symbol selector 301. In the normal course of the game, these symbols are displayed on the display (54 of FIG. 1, 16 of FIG. 2, 106 of FIG. 3 and 204 of FIG. 5). In embodiments, the selected symbols are displayed as a plurality of virtual reels on a video display, having columns and rows. Alternatively, the display may comprise a stepper motor and physical reels.

In these embodiments, the outcome of the game depends on the selected symbols appearing in the display and may include a win outcome, loss outcome, trigger outcome, or feature outcome or any other outcome. Outcomes may be determined on the basis of symbols appearing in the one or more horizontal lines, diagonal lines, or any other predetermined combination.

As discussed above, the game outcome is determined by the outcome generator based on combinations of symbols selected and appearing in the display 400. The symbols may be any symbols. As will be appreciated, many different types of symbols are used in gaming systems. A set of symbols may include standard symbols and function symbols. For example, standard symbols may resemble fruit such as apples, pears and bananas, with a win outcome being determined when a predetermined number of the same fruit appear on a display on the same line, scattered, and so on. The function associated with a function symbol, may be a "wild", wherein display of the function symbol is treated during consideration of the game outcome as any of the standard symbols. Other functions may include scatter functions, multiplier functions, repeat win functions, jackpot functions and feature commencement functions.

In embodiments of the present invention, awards may be given on the basis of a "cluster" being selected from the set of symbols. A cluster comprises a group of symbols, each symbol in the group being contiguous to another symbol in the group along at least one edge, and the group spanning at least two columns of the symbol positions display. The cluster may comprise symbols that are the same, or a predetermined set of symbols (e.g. consecutive numbers, consecutive cards in a poker game, particular characters, or any other type of grouping).

FIG. 8 shows an example of a cluster extending across four columns (C1 to C4) and extending down three rows (R2, R3 and R4). In this embodiment, payment is based on the number of columns spanned by the cluster multiplied by the number of symbol positions in the cluster. In the case of FIG. 8, the payout will be based on four columns×six symbol positions.

In this embodiment of game play, the cluster must span at least two columns. There is no threshold on the minimum number of symbols in a cluster. A cluster could actually contain only two symbols.

The cluster is not paid solely based on the number of symbols in the cluster, but the number of columns the cluster spans defines the pay which is then multiplied by the total number of symbols in the cluster. This pay methodology, although new, is advantageously intuitive to game players.

Clusters are groups of symbols on contiguous columns and are not required to begin on the left most column of the display or end on the right most column of the display. A cluster could actually be a group of symbols in the centre of the display, not touching any edge of the display. This is advantageously a benefit, as players will realize that a win is always possible until the last reel stops.

Further, in this embodiment, the display is populated with symbols using a traditional slot method with virtual spinning reels or actual spinning reels and stack symbols, and not purely randomly. This gives the look and feel of a traditional slot game.

In some reel-based games, such as Reel Power (referred to above), the cost of the game rises exponentially, making it very difficult to afford extreme reel growth. In embodiments of the present invention, the requirement that each symbol in a cluster touch another symbol in the cluster along at least one edge, provides a method of controlling the exponential cost.

Games may be played where clusters provide the only chance of receiving an award. In other embodiments, however, clusters may be played along with other types of award based on other types of symbol selection. For example, traditional line wins, scatter wins, jackpots, feature games. In an embodiment, a cluster game may be played over a feature game triggered by a particular symbol selection in a base game. In other embodiments, clusters may be provided in a base game.

FIGS. 7 through 12 show some examples of reel displays which may result in cluster awards. It will be appreciated that there may be many other cluster variations and reel variations where cluster awards may be paid.

FIG. 7 shows a simple cluster spanning three columns C1 to C3 and being on a single row, R3.

Figure 9:
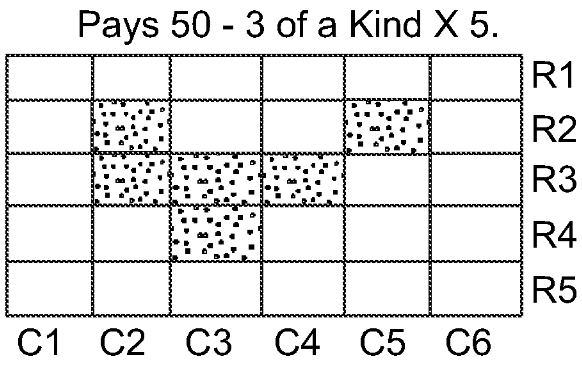

FIG. 9 shows a cluster which extends across three reels and has five cells. There is a symbol in C5 that would form part of a cluster if it was correctly positioned. However, this symbol does not share any contiguous edge with the rest of the cluster, so it does not form part of the cluster.

Figure 10:
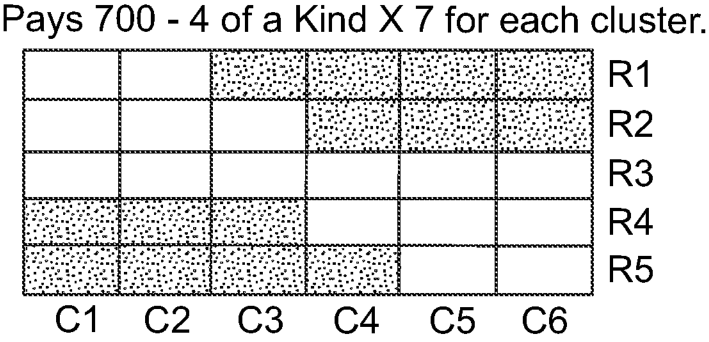

FIG. 10 shows a symbol selection comprising two clusters. Each cluster provides a payout to the player. The first cluster goes across four reels C1 to C4 and two rows, R4, R5, and has seven symbols. The second cluster also extends across four columns, C3 to C6, and two rows, R1 and R2, and has seven symbols. Both clusters give the same payout.

Figure 11:
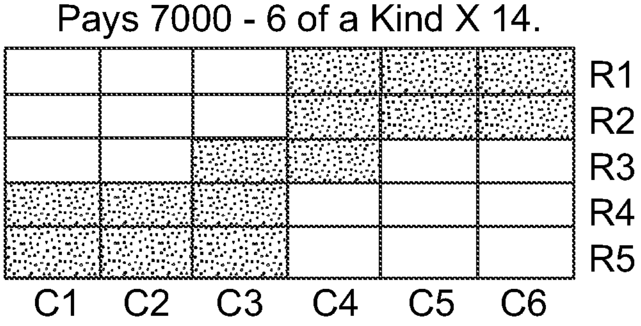

FIG. 11 shows a large cluster extending all the way across the columns (C1 to C6) and all the way down the rows, R1 to R5. It has fourteen cells in the cluster, so it provides a fourteen times six payout.

Figure 12:
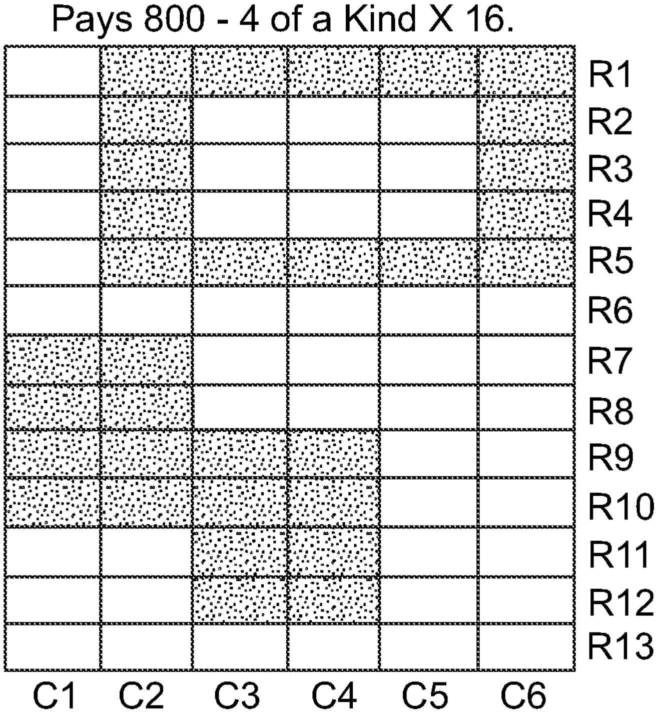

FIG. 12 shows a very expanded display with thirteen rows and six columns. There are two clusters shown. The number of clusters available can be selected to control the payout, despite the very large display.

The following table is a pay table for the clusters for this particular embodiment.

| Of A Kind | Pays |
|---|---|
| 2 | 5 |
| 3 | 10 |
| 4 | 50 |
| 5 | 105 |
| 6 | 500 |

The left hand column of the table indicates the number of reels spanned by the cluster. The payout in this embodiment depends on the number of reels spanned by the cluster. If two reels are spanned, the payout is 5 units. If three, 10 units, etc. as per the table. This pay is then multiplied by the number of symbols in the cluster to give the final payout.

Figure 13:
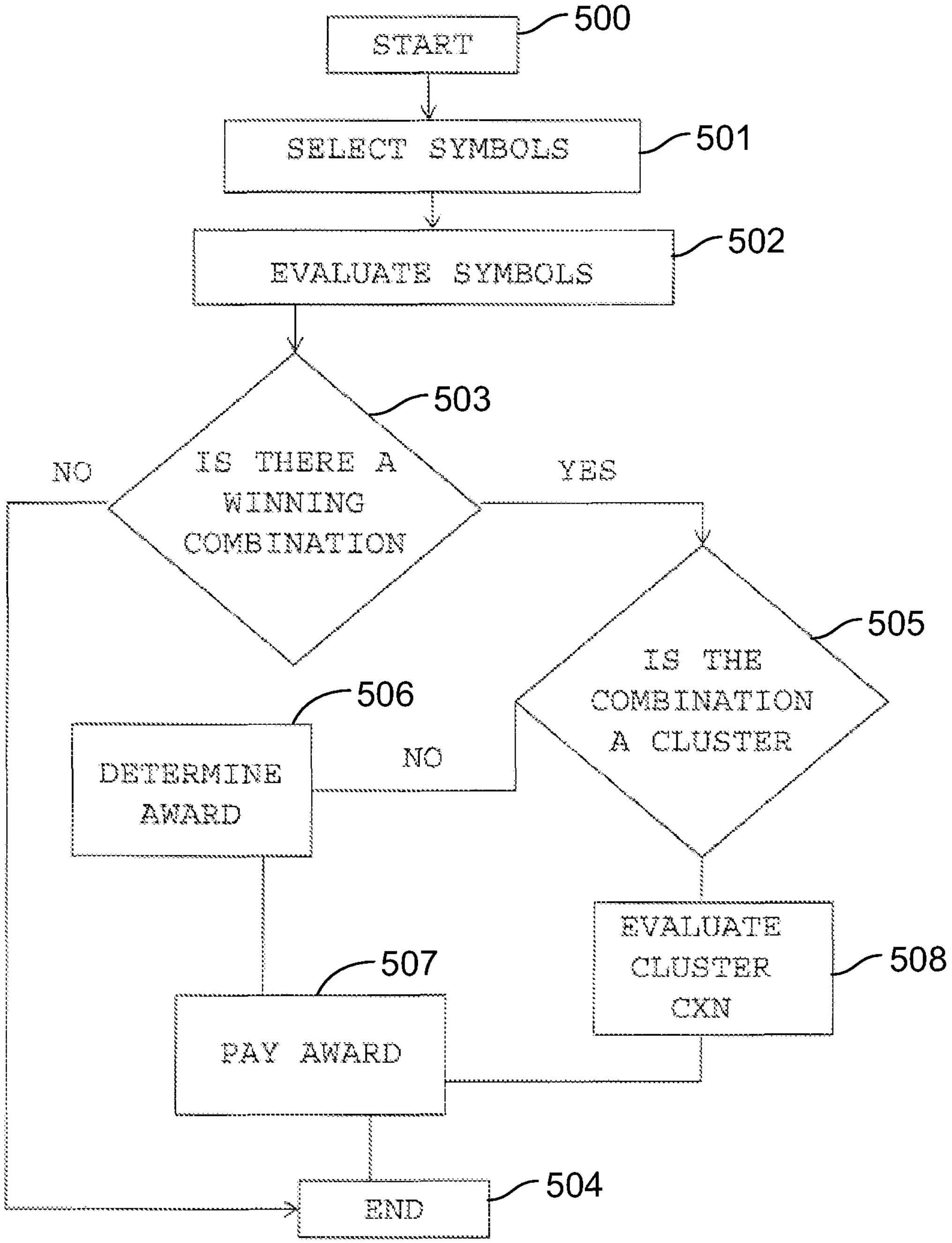
FIG. 13 is a flow diagram illustrating operation of a gaming system in accordance with an embodiment of the present invention.

Referring to FIG. 13, a game playing process in accordance with an embodiment of the present invention will be summarized.

At step 500, a player may enter credit or otherwise commence play of the game. At step 501 symbols are selected from a predetermined set of symbols. At 502, the symbols are evaluated to see if any award condition is satisfied.

At step 503, it is determined whether there is a winning combination. If there is not, then the game proceeds to the "end", step 504.

If there is a winning combination, it is determined (step 505) whether or not that combination is a cluster. There may be other traditional slot combinations such as line wins, scatters, etc. that may provide a win. If a combination is not a cluster at step 506 the award is determined based on the other combination of symbols (e.g. traditional line). At step 507, the award is paid. If the combination is a cluster, then at step 508, the cluster win is evaluated based on the number of columns and number of symbols in the cluster. The award is paid at step 507.

In the above embodiments, the symbol display is effected as a reel-type display. The invention is not limited to this, and other types of display may be utilized. For example, the display may comprise a matrix of cells having rows and columns which are not represented as reels. Alternatively, a different type of reel display may be provided, where the rotation is in the horizontal direction i.e. the reels are horizontal reels, not vertical reels. Other types of display may be implemented for other embodiments of the invention.

In the above embodiments, payout is determined by the number of columns over which the cluster extends, multiplied by the number of symbols in the cluster. The invention is not limited to this payout method. Other methods of calculating payout may be utilized. For example, the number of rows over which the cluster extends may be used as a method of calculating payout. There may be other ways of calculating payout.

The above embodiments of the invention are implemented as a gaming machine or a gaming system comprising a server and client architecture. As discussed above, the invention is not limited to this. The embodiments may be implemented on-line, for example, where a user device such as a computer or mobile device, may access game play over the network such as the Internet. In such an on-line embodiment, credits may be entered by a payment method such as credit card, for example. Payouts may be paid into an account of the user.

A gaming machine and system in accordance with embodiments of the present invention may be at least partly implemented utilizing program code. The program code may be supplied in a number of ways, for example, a tangible computer readable storage medium, such as a disk or memory device e.g. an EEPROM, for example, that could replace part of memory 103 or as a data signal (by transmitting it from a server). Further, different parts of the program code can be executed by different devices, for example in a client server relationship. Persons skilled in the art will appreciate that program code provides a series of instructions executable by the processor.

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed is:

1. A gaming machine, comprising:

a display; and a game controller executing instructions stored in a memory, wherein execution of the instructions causes the game controller to at least:

present, via the display, a game outcome comprising a plurality of symbols at a plurality of display positions of the display;

present, via the display, each winning symbol cluster in the plurality of symbols, wherein each winning symbol cluster comprises a respective same symbol at each display position in the respective winning symbol cluster, wherein each display position in the respective winning symbol cluster is adjacent to at least one other display position in the respective winning symbol cluster, and wherein no display position of the plurality of display positions is shared by multiple winning symbol clusters; and present, for each winning symbol cluster, a respective cluster award that is based on a quantity of the respective same symbol in the respective winning symbol cluster.

2. The gaming machine of claim 1, wherein each display position in each winning symbol cluster is orthogonally adjacent to at least one other display position in the respective winning symbol cluster.

3. The gaming machine of claim 1, wherein execution of the instructions causes the game controller to determine each cluster award by multiplying a respective base award by the quantity of the respective same symbol in the respective winning symbol cluster.

4. The gaming machine of claim 1, wherein:

the plurality of display positions are arranged in rows; and each winning symbol cluster spans a plurality of rows.

5. The gaming machine of claim 4, wherein execution of the instructions causes the game controller to determine the respective cluster award for each winning symbol cluster by multiplying a respective base award by the quantity of the respective same symbol in the respective winning symbol cluster.

6. The gaming machine of claim 5, wherein execution of the instructions causes the game controller to determine the respective base award for each winning symbol cluster based on a quantity of rows in the plurality of rows spanned by the respective winning symbol cluster.

7. The gaming machine of claim 1, wherein:

the plurality of display positions are arranged in columns; and each winning symbol cluster spans a plurality of columns.

8. The gaming machine of claim 7, wherein execution of the instructions causes the game controller to determine the cluster award for each winning symbol cluster by multiplying a respective base award by the quantity of the respective same symbol in the respective winning symbol cluster.

9. The gaming machine of claim 8, wherein execution of the instructions causes the game controller to determine the respective base award for each winning symbol cluster based on a quantity of columns in the plurality of columns spanned by the respective winning symbol cluster.

10. The gaming machine of claim 8, wherein execution of the instructions causes the game controller to:

determine that the respective base award for each winning symbol cluster has a first value in response to the plurality of columns spanned by the respective winning symbol cluster being a first quantity; and determine that the respective base award for each winning symbol cluster has a second value greater than the first value in response to the plurality of columns spanned by the respective winning symbol cluster being a second quantity greater than the first quantity.

11. A method of a gaming machine, the method comprising:

presenting, via a display of the gaming machine, a game outcome comprising a plurality of symbols at a plurality of display positions;

identifying, with a game controller of the gaming machine, winning symbol clusters formed by the plurality of symbols of the game outcome, wherein each winning symbol cluster comprises a respective same symbol at each display position in the respective winning symbol cluster, wherein each display position in the respective winning symbol cluster is adjacent to at least one other display position in the respective winning symbol cluster, and wherein no display position of the plurality of display positions is shared by multiple winning symbol clusters; and presenting, with the game controller via the display, a respective cluster award for each winning symbol cluster that is based on a quantity of the respective same symbol in the respective winning symbol cluster.

12. The method of claim 11, comprising:

presenting the plurality of symbols of the game outcome in rows of the plurality of display positions; and determining, with the game controller, the cluster award for a first winning symbol cluster based on a quantity of rows spanned by the first winning symbol cluster.

13. The method of claim 11, comprising determining, with the game controller, the cluster award for a first winning symbol cluster by multiplying a base award for the first winning symbol cluster by a quantity of the display positions in the first winning symbol cluster.

14. The method of claim 13, comprising:

presenting the plurality of symbols of the game outcome in columns of the plurality of display positions; and determining, with the game controller, the base award for the first winning symbol cluster based on a quantity of columns spanned by the first winning symbol cluster.

15. The method of claim 13, comprising:

presenting the plurality of symbols of the game outcome in columns of the plurality of display positions; and determining, with the game controller, that the base award for the first winning symbol cluster has a first value in response to the first winning symbol cluster spanning a first quantity of columns spanned and has a second value greater than the first value in response to the first winning symbol cluster spanning a second quantity of columns that greater than the first quantity of columns.

16. One or more non-transitory computer readable media comprising instructions, which when executed, cause a gaming system to at least:

present, via a display of the gaming system, a game outcome comprising a plurality of symbols at a plurality of display positions;

identify winning symbol clusters formed by the plurality of symbols of the game outcome, wherein each winning symbol cluster comprises a respective same symbol at each display position in the respective winning symbol cluster, wherein each display position in the respective winning symbol cluster is adjacent to at least one other display position in the respective winning symbol cluster, and wherein no display position of the plurality of display positions is shared by multiple winning symbol clusters;

calculate a cluster award for each winning symbol cluster by multiply a base award for the respective winning symbol cluster by a quantity of display positions in the respective winning symbol cluster; and present, via the display of the gaming system, the cluster award for each winning symbol cluster.

17. The one or more non-transitory computer readable media of claim 16, wherein the instructions, when executed, cause the gaming system to:

present the plurality of symbols of the game outcome in rows of the plurality of display positions; and determine the cluster award for a first winning symbol cluster based on a quantity of rows spanned by the first winning symbol cluster.

18. The one or more non-transitory computer readable media of claim 16, wherein the instructions, when executed, cause the gaming system to:

present the plurality of symbols of the game outcome in columns of the plurality of display positions; and determine the cluster award for a first winning symbol cluster based on a quantity of columns spanned by the first winning symbol cluster.

19. The one or more non-transitory computer readable media of claim 16, wherein the instructions, when executed, cause the gaming system to:

present the plurality of symbols of the game outcome in columns of the plurality of display positions; and determine the base award for a first winning symbol cluster based on a quantity of columns spanned by the first winning symbol cluster.

20. The one or more non-transitory computer readable media of claim 19, wherein the instructions, when executed, cause the gaming system to determine that the base award for the first winning symbol cluster has a first value in response to the quantity of columns spanned by the first winning symbol cluster being a first quantity and has a second value greater than the first value in response to the quantity of columns spanned by the first winning symbol cluster being a second quantity greater than the first quantity.

* * * * *